United States Patent [19]

Potter

[11] Patent Number: 4,853,000
[45] Date of Patent: Aug. 1, 1989

[54] PROCESS AND COMPOSITION FOR A METAL POLISH

[76] Inventor: John L. Potter, Box 321, Strong City, Kans. 66869

[21] Appl. No.: 125,115

[22] Filed: Nov. 25, 1987

[51] Int. Cl.$^4$ ............................................. B24D 3/02
[52] U.S. Cl. ....................................... 51/309; 51/302; 51/304; 106/3; 106/8; 106/11
[58] Field of Search ........................ 51/302, 309, 304; 106/3, 8, 11

[56] References Cited

U.S. PATENT DOCUMENTS

| | | | |
|---|---|---|---|
| 47,082 | 4/1865 | Bartholow | 106/4 |
| 910,569 | 1/1909 | Peco | 106/10 |
| 1,153,086 | 9/1915 | Hancock | 106/4 |
| 1,761,677 | 6/1930 | Nielsen | 106/5 |
| 3,248,235 | 4/1966 | Pryor et al. | 106/3 |
| 3,652,301 | 3/1972 | Damron | 106/5 |
| 4,064,061 | 12/1977 | Henry | 106/8 |
| 4,308,060 | 12/1981 | Talbot | 106/11 |

Primary Examiner—Paul Lieberman
Assistant Examiner—Willie J. Thompson
Attorney, Agent, or Firm—George L. Rushton

[57] ABSTRACT

The cleaning and polishing composition for metals described herein comprises (a) a flour component, (b) a mineral spirits component, and (c) an abrasive component. The abrasive component comprises various combinations of aluminum oxide, ferric oxide, and chromic oxide, along with various animal fats, tallow glycerides, process oils, and wetting agents. Various metals and alloys, such as aluminum, magnesium, gold, silver, brass, copper, stainless steel, and chromium can be cleaned and polished by these compositions.

20 Claims, No Drawings

PROCESS AND COMPOSITION FOR A METAL POLISH

BACKGROUND OF THE INVENTION

1. Field of the Invention

This invention relates to a polishing product comprising a plurality of components and to a process for combining said components to form a product having cleaning and polishing properties.

One object of the invention is to produce a cleaner and polish for several different metals, which may be found in various articles.

A further object of the invention is to produce a cleaner and polish for metals that is easy to apply and to remove, leaving a cleaned and polished metallic surface.

A further object of the invention is to produce a cleaner and polish that will not scratch the metallic surface of the article to be cleaned and polished.

A further object of the invention is to use inexpensive, yet efficient, materials to produce a cleaning and polishing product that can be sold in a mass market.

2. Description of the Prior Art

Many metal products, including silver hollow ware and tableware, automobile and truck exterior surfaces, brass ornaments and articles, and chrome or chrome-plated articles, are prone to have their surfaces dulled by environmental conditions or by handling by human hands. Among others, oxides and sulfides form on the metal surfaces, and these substances are sometimes difficult to remove without scratches or pitting the surfaces of the articles. Other prior art cleaners and polishes are often messy to apply and tend to dry unevenly, leaving surfaces that are not even in luster. Also, some cleaners and polishes contain very abrasive components that cause scratching of the metallic surface, thus requiring a buffing action later.

SUMMARY OF THE INVENTION

Many of the deficiencies of the prior art cleaners and polishes are avoided or reduced by the present invention. The ingredients of the composition are readily available, are easily compounded, and have a stable shelf life. The product is easily applied to the metallic surface, requires only a modest amount of rubbing to remove the undesirable film on the metals, and wipes to a lustrous finish.

The instant product comprises a mixture of an abrasive component, a flour component, and a mineral spirits component, in the respective and approximate percentages of 18–23%, 0.25–0.35%, and 77–82%, based on the total weight of the finished composition. The general process of preparing the cleaning and polishing product comprises the steps of mixing the flour and abrasive components, adding the mineral spirits component, heating the mixture to around 200° F., and cooling.

DESCRIPTION OF THE PREFERRED EMBODIMENTS

The present invention is a cleaning and polishing agent useful on metal and alloys such as brass, copper, aluminum, chrome, gold and silver articles. Among the characteristics of the product, it is to be noted that there are three differing formulations, using the same general ingredients but differing in the percentages of each ingredient. These three formulations have different colors, due to variations in the abrasive component.

And it is to be noted that the color of each formulation offers a guide to a preferred use of that formulation. For example, the red product, considered to be the least abrasive, is preferred for use on aluminum or magnesium (including alloys) metal articles, while the green product, considered the most abrasive, is preferably used on chrome or stainless steel articles. The white product, an intermediate abrasive, is preferred for silver, copper, brass, or gold articles. Although these formulations can be used on painted surfaces, such as car and truck bodies, it is suggested that frequent and repeated use on such painted surfaces can lead to abrasion and dulling of the surface.

The major constituent of the abrasive component of my products is aluminum oxide. This is the basis of the white product. A mixture of aluminum oxide and ferric oxide is found in the red product, while aluminum oxide and chromic oxide comprise the abrasive portion of the green product. The ratio of the above compounds in the abrasive component varies, depending on the abrasive result desired. The percentage of aluminum oxide in the white product can vary from about 12 wt. % to about 18 wt. %. The percentage of ferric oxide in the red product varies from about 3 wt. % to about 4.5 wt%. The percentage of chromic oxide in the green product varies from about 0.5 wt. % to about 3 wt. %. The above wt. %s are based on the finished cleaner and polish composition.

The aluminum oxide used in a common article of commerce, with a grind size or particle size of about 325 mesh. The ferric oxide (iron oxide) used, which is red in color, is also an article of commerce and has a particle size of about 325 mesh. Similarly, the chromic oxide used is a common article of commerce, is green in color, and has a particle size of about 325 mesh. The chromic oxide adds to the cutting action of the more abrasive green product.

All of the abrasive component products, as received from the manufacturer, include a greasy, waxy, or fatty material, such as animal fat (hydrogenated), tallow glycerides, mineral greases, stearic acid, and petroleum oils. These materials act as binders and contribute to the sealing of the polished metal surfaces. In varying percentages with the abrasive materials, the mixture can be formed as bars or cakes. If desired, the abrasive oxides can be obtained separately and combined with the waxy or fatty materials during processing of the products of the invention.

As received, the abrasive component of the white product is a premixed material. The aluminum oxide portion of the mixture varies from about 69 wt. % to about 75 wt. %, preferably from about 71 wt. %, to about 73 wt. %. And the animal fat portion varies from about 25 wt. % to about 31 wt. %, preferably from about 27 wt. % to about 29 wt. %. The "as received" mixture is an off-white, waxy solid, insoluble in water, with a specific gravity of about 1.5–2.0.

The red product typically comprises about 50–60 wt. % aluminum oxide, 15–20 wt. % ferric oxide, 10–16 wt. % hydrogenated animal fat, 8–15 wt. % tallow glycerides, and 1–2 wt. % process oils and wetting agents. The mixture is a red solid cake or bar with a specific gravity of about 1.2.

The green product comprises 64–75 wt. % aluminum oxide, 3–15 wt. % chromic oxide, 10–16 wt. % hydrogenated animal fat (stearic acid), 8–15 wt. % tallow (fats and triglycerides), 2–4 wt. % petroleum oils (mineral greases), and small amounts of surfactants and amines. The mixture is a hard green cake with a bland grease odor, insoluble in water, slightly soluble in alcohol, and soluble in most chlorinated solvents. The specific gravity is about 1.5.

The mineral spirits component is described as a hydrotreated middle petroleum distillate. The distillate comprises a "cut" of predominantly $C_{14}$-$C_{18}$ isoparaffinic hydrocarbons, and the mixture is obtainable from a number of refinery sources, such as Exxon Isopar V. The "cut" has a typical boiling range of about 490–625° F. (IBP to dry point) (254–329° C.), a specific gravity of about 0.82, a vapor pressure of 0.15 mm Hg @ 77° F., and a clear water-white liquid appearance, essentially odorless.

The flour component is typically an unrefined wheat flour, with no added ingredients, passing through a 100 mesh screen sieve.

A typical procedure for preparing a 8 fl.oz. bottle of the finished cleaner and polish is as follows:

In a stainless steel container, place 0.6 grams of unrefined wheat flour. To this is added 45 grams of the abrasive component. This weight of abrasive component is the same for all the colors of the cleaner/polish, as described above. For the red product, this weight comprises 55 wt. % aluminum oxide, 17.5 wt. % ferric oxide, 13 wt. % hydrogenated animal fat, 12 wt. % tallow triglycerides, and 2.5 wt. % of a mixture of process oils and wetting agent. For the green product, the component comprises 70 wt. % aluminum oxide, 5.5 wt. % chromic oxide, 13 wt. % hydrogenated animal fat, and 11.5 wt. % tallow glycerides. For the white product, the component comprises 72 wt. % aluminum oxide and 28 wt. % hydrogenated animal fat.

To the above dry components, add 167.8 grams of mineral spirits (e.g. Isopar V).

The mixture is warmed and agitated to form a smooth mixture, with additional heating to about 200° F. (93° C.). During this heating period, the solid abrasive component softens and partially dissolves, to form a uniform mixture. After sufficient heating and agitation, the mixture is cooled and then poured into containers which are sealed.

During storage, the mixture may separate into a lower pasty layer and upper liquid layer. This separation does not affect the utility of the product. Shaking or agitation of the contents of the container will result in a liquid mixture suitable for the intended use. Freeze and thaw cycles have been carried out on these products. After thawing, agitation, as noted above, results in a suitable and usable product. Samples of the products, when kept in the original and sealed containers, have shown satisfactory cleaning and polishing qualities after being stored for 12 months.

The above descriptions and directions illustrate the preferred embodiments of the invention. One skilled in the art will understand that small variations in the ingredients, the proportions, and the method of combining the ingredients are allowable. It is also understood that optimum results are attained when the preferred ingredients, proportions, and methods are used. Less-than-optimum results follow when the recipe is not followed.

In the flour component, flours of other grains, such as rye, oats, barley, etc., can be used, as long as the particle or sieve size is followed. Wheat flour is preferred because it is well known, is an article of commerce, and is widely available. If less than the preferred range of flour is used, problems are encountered in applying the finished product to the metal article. The applied liquid mixture tends to dry slowly, leading to smearing on the metal surface. Similarly, if too much flour is used in the recipe, there are again problems in application, in that the applied mixture tends to dry rapidly, thus leading to a gumming up of the mixture. This leads to poor polishing and cleaning.

The mineral spirits component is mainly a vehicle used in mixing and applying the cleaner and polish. The mineral spirits do have a minor cleaning ability in removing some of the obvious grime and soil found on the articles, such as oil or road tar present on trucks. Too great a proportion of mineral spirits in the mixture results in a lowered cleaning ability and lengthened drying time, while a less than preferred amount of mineral spirits results in a thickened mixture that is difficult to apply.

In the abrasive component, the fatty materials found in the premixed abrasive are of a general nature, such as various fats, glycerides, tallows, etc. mixed at times with process oils and surfactants. As mentioned previously, the abrasive metal oxides and the fatty materials can be mixed prior to addition of the flour component and the mineral spirits component in the processing of the ingredients, but the use of the premixed abrasive component is convenient and results in less storage and inventory problems. In all the examples listed below, it is to be noted that a deficiency or excess of metal oxide in the abrasive component resulted in less than successful results. Although some cleaning and polishing would result from using a product not having the preferred ranges of ingredients, the invention is based upon optimum results attained by following the preferred embodiments. In the white product, using less than the preferred amount of $Al_2O_3$ results in a thin mixture that does not clean and polish in the desired manner. Too much of the oxide gives a thick mixture that affects the drying, cleaning, and polishing properties adversely. In the red product, omitting the $Al_2O_3$ gives a product that tends to scratch the aluminum and magnesium articles that are best suited for treatment by the red product. Again, an excess or deficiency of $Fe_2O_3$ in the product results in less than optimum cleaning and polishing results. In the green product, an excess of $Cr_2O_3$ in the mixture results in scratching of the metal articles treated, while less than the desirable amount of the oxide results in poor cleaning, possibly requiring a second treatment.

EXAMPLES

Red product (called Phase I) - preferred for aluminum, magnesium, and related alloys.

Aluminum portions of a truck-trailer combination were cleaned and polished in comparison tests using Phase I and two of the leading competitive aluminum cleanerpolishes. Phase I was applied in less time and was ready for wiping-polishing in much less time, compared with the other cleaner-polishes.

A similar comparison test was done later, using 5 different trucks and the same three cleaner-polishes as above. The various truck drivers were allowed to apply the three cleaner-polishes on their own selections of various areas of the individual trucks. All the drivers agreed that Phase I was easier to apply and wipe off and that Phase I left a cleaner and brighter area, compared with the other cleaner-polishes. Follow-up examination on the trucks two weeks later showed that the areas cleaned and polished with Phase I retained polish and shine better than the areas cleaned and polished with the competitive compositions.

Green product (called Phase II) - preferred for chrome and stainless steel.

Phase II was applied to one-half of the front bumper of a passenger car, resulting in a clean shiny portion of the bumper. After two weeks, with the usual travel involving summer heat, road dust, rain, and two trips through a car wash, the treated portion of the bumper was still bright and shiny. It was noted that insect remains typically found on car bumpers were easily washed off the treated portion, while insect remains on the untreated portion of the bumper required the usual scrubbing and extra effort to remove.

Three restaurants used Phase II to clean and polish the stainless steel of various kitchen items. The initial appearance after cleaning and polishing was that of new items. Later, after several days of typical use and several cycles of the usual former washing and cleaning methods, the stainless steel items retained most of the initial appearance noted after cleaning and polishing with Phase II.

White product (called Phase III) - preferred for silver and brass.

Sterling silver tableware (4 place settings) that had not been cleaned for over two years and was thus heavily tarnished was cleaned and polished with Phase III. Shile and luster approaching that of the original resulted. The silverware was returned to the chest where it had been stored previously. Nine months later, the silverware was examined. All pieces had retained the luster and shine noted after the cleaning and polishing with Phase III.

Some pieces of sterling silver hollow ware having somewhat intricate patterns and designs had moderate to heavy tarnish. Cleaning with a commercially-available paste silver cleaner resulted in only a modest improvement in appearance, since the tarnish in the deep designs, furrows, and crevices could be partially removed only by using rag-covered toothpicks with the paste polish, in the hard-to-clean areas.

Phase III cleaner-polish was applied to the hollow ware following the above-described treatment. The cleaning cloths used in the Phase III treatment soon turned black, and additional cleaning of the still-tarnished areas was evident. Since there was still some tarnish remaining, clean cloths with new Phase III product were used, and the majority of the remaining tarnish was removed. Polishing of the cleaned pieces of hollow ware with a clean cloth resulted in shiny and lustrous articles. Six months later, all pieces of the hollow ware retained the shine and luster noted above.

Four brass goblets had been sent to a jewelry shop specializing in brass cleaning. The goblets were returned, uncleaned, with a note stating that the surface of the goblets had been exposed to the atmosphere and had deteriorated. Phase III was applied to the goblets, using the customary and normal method of cleaning and polishing. The cleaned and polished goblets had an almost-new appearance. It was noted that the above treatment, as compared with the previous procedure of sending the goblets to the jewelry store, resulted in a great saving of time, a marked decrease in cost, and a resultant appearance that was equal to or superior to the appearances of previous brass articles sent to said store.

While the present invention has been described herein with reference to particular embodiments thereof, it will be appreciated by those skilled in the art that various changes and modifications can be made without departing from the scope of the invention as set forth.

I claim:

1. A cleaning and polishing composition for metals, comprising
   (a) from about 0.25 to about 0.35 wt. % of a flour component, comprising unrefined wheat flour, the wt. % being based on the finished cleaner and polish composition,
   (b) from about 77 to about 82 wt. % of a mineral spirits component, comprising a hydrotreated middle petroleum distillate of $C_{14}$-$C_{18}$ isoparaffinic hydrocarbons, the wt. % being based on the finished cleaner and polish composition, and
   (c) from about 18 to about 23 wt. % of an abrasive component comprising a metal oxide, the wt. % being based on the finished cleaner and polish composition.

2. The composition of claim 1, wherein said abrasive component is a white product comprising from about 12 wt. % to about 17.5 wt. % $Al_2O_3$ having a particle size of about 325 mesh and from about 4.5 wt. % to about 7.2 wt. % of an animal fat composition, the wt. % being based on the finished cleaning and polishing composition.

3. The composition of claim 1, wherein said abrasive component is a red product comprising from about 9 wt. % to about 14 wt. % $Al_2O_3$ having a particle size of about 325 mesh, from about 2.5 wt. % to about 4.8 wt. % $Fe_2O_3$ having a particle size of about 325 mesh, and from about 3.6 wt. % to about 8 wt. % of a composition comprising hydrogenated animal fat, tallow glycerides, process oils, and wetting agents, the wt. %s being based on the finished cleaning and polishing composition.

4. The composition of claim 1, wherein said abrasive component is a green product comprising from about 11 wt. % to about 17.7 wt. % $Al_2O_3$ having a particle size of about 325 mesh, from about 0.5 wt. % to about 3.5 wt. % $Cr_2O_3$ having a particle size of about 325 mesh, and from about 3.5 wt. % to about 8 wt. % of a composition comprising hydrogenated animal fat, tallow fats and triglycerides, petroleum oils, and surfactants, the wt. %s being based on the finished cleaning and polishing composition.

5. A process for preparing a cleaning and polishing composition for metals, comprising the steps of
   mixing a flour component comprising unrefined wheat flour passing through a 100 mesh screen sieve, present in from about 0.25 wt. % to about 0.35 wt. %, the wt. % being based on the finished cleaner and polish composition, from about 12 wt. % to about 17.5 wt. % of an abrasive component comprising metal oxides selected from the group consisting essentially of aluminum oxide, ferric oxide, and chromic oxide, and from about 4.5 wt. % to about 7.2 wt. % of fatty materials selected from the group consisting essentially of animal fats, tallow glycerides, tallow triglycerides, process oils, petroleum oils, surfactants, and wetting agents, and a mineral spirits component comprising a hydrogenated middle petroleum distillate of $C_{14}$-$C_{18}$ isoparaffinic hydrocarbons, present from about 77 wt. % to about 82 wt. %, the wt. % being based on the finished cleaner and polish composition,
   warming and agitating the above mixture, with the final temperature being between about 190° F. and 210° F., and cooling the mixture.

6. A method of cleaning and polishing articles made of silver, copper, brass, or gold comprising
   (a) applying to the article a cleaning and polishing composition comprising
      a flour component comprising unrefined wheat flour passing through a 100 mesh screen sieve, present in from about 0.25 wt. % to about 0.35 wt. %, the wt. %s being based on the finished cleaner and polish composition,
      a mineral spirits component comprising a hydrogenated middle petroleum distillate of $C_{14}$-$C_{18}$ isoparaffinic hydrocarbons, present in from about 77 wt. % to about 82 wt. %, the wt. %s being based on the finished cleaner and polish composition, and
      an abrasive component of a white, waxy appearance comprising from about 12 wt. % to about 17.5 wt. % $Al_2O_3$ having a particle size of about 325 mesh, and from about 4.5 wt. % to about 7.2 wt. % of an animal fat composition, the wt. %s being based on the finished cleaner and polish composition, and
   (b) wiping or rubbing the metal article to produce a cleaned and polished article.

7. A method of cleaning and polishing articles made of aluminum, magnesium, or alloys of these metals comprising
   (a) applying to the article a cleaning and polishing composition comprising
      a flour component comprising unrefined wheat flour passing through a 100 mesh screen sieve, present in from about 0.25 wt. % to about 0.35 wt. %, the wt. %s being based on the finished cleaner and polish composition,
      a mineral spirits component comprising a hydrogenated middle petroleum distillate of $C_{14}$-$C_{18}$ isoparaffinic hydrocarbons, present in from about 77 wt. % to about 82 wt. %, the wt. %s being based on the finished cleaner and polish composition, and
      an abrasive component of a red cake or bar appearance comprising from about 9 wt. % to about 14 wt. % $Al_2O_3$ having a particle size of about 325 mesh, from about 2.5 wt. % to about 4.8 wt. % $Fe_2O_3$ having a particle size of about 325 mesh, and from about 3.6 wt. % to about 8 wt. % of a composition comprising hydrogenated animal fat, tallow glycerides, process oils, and wetting agents, the wt. %s being based on the finished cleaner and polish composition, and
   (b) wiping or rubbing the metal article to produce a cleaned and polished article.

8. A method of cleaning and polishing chrome or stainless steel articles comprising
   (a) applying to the article a cleaning and polishing composition comprising
      a flour component comprising unrefined wheat flour passing through a 100 mesh screen sieve, present in from about 0.25 wt. % to about 0.35 wt. %, the wt. %s being based on the finished cleaner and polish composition,
      a mineral spirits component comprising a hydrogenated middle petroleum distillate of $C_{14}$-$C_{18}$ isoparaffinic hydrocarbons, present in from about 77 wt. % to about 82 wt. %, the wt. %s being based on the finished cleaner and polish composition, and
      an abrasive component of a green cake appearance comprising from about 11 wt. % to about 17.7 wt. % $Al_2O_3$ having a particle size of about 325 mesh, from about 0.5 wt. % to about 3.5 wt. % $Cr_2O_3$ having a particle size of about 325 mesh, and from about 3.5 wt. % to about 8 wt. % of a composition comprising hydrogenated animal fat, tallow fats and triglycerides, petroleum oils, and surfactants, the wt. %s being based on the finished cleaner and polish composition, and
   (b) wiping or rubbing the metal article to produce a cleaned and polished article.

9. A cleaning and polishing composition for metals comprising from about 0.25 to about 0.35 wt. % flour; from about 77 to about 82 wt. % mineral spirits; from about 12 to about 17.5 wt. % $Al_2O_3$; and from about 4.5 to about 7.2 wt. % of an animal fat composition, the wt. % based on the finished composition.

10. The composition of claim 9 wherein said $Al_2O_3$ has a particle size of about 325 mesh and wherein said $Al_2O_3$ and animal fat composition in combination has a specific gravity of about 1.5-2.0.

11. The composition of claim 9 wherein said mineral spirits comprise a hydrotreated middle petroleum distillate of $C_{14}$-$C_{18}$ isoparaffinic hydrocarbons.

12. A cleaning and polishing composition for metals comprising from about 0.25 to about 0.35 wt. % flour; from about 77 to about 82 wt. % mineral spirits; from about 9 to about 14 wt. % $Al_2O_3$; from about 2.5 to about 4.8 wt. % $Fe_2O_3$; and from about 3.6 to about 8 wt. % of a composition comprising hydrogenated animal fat, tallow glycerides, process oils, and wetting agents, the wt. % based on the finished composition.

13. The composition of claim 12 wherein said $Al_2O_3$ and $Fe_2O_3$ independently have a particle size of about 325 mesh.

14. The composition of claim 12 wherein said mineral spirits comprise a hydrotreated middle petroleum distillate of $C_{14}$-$C_{18}$ isoparaffinic hydrocarbons.

15. A cleaning and polishing composition for metals comprising from about 0.25 to about 0.35 wt. % flour; from about 77 to about 82 wt. % mineral spirits; from about 11 to about 17.7 wt. % $Al_2O_3$; from about 0.5 to about 3.5 wt. % $Cr_2O_3$; and from about 3.5 to about 8 wt. % of a composition comprising hydrogenated animal fat, tallow fats and triglycerides, petroleum oils, and surfactants, the wt. % based on the finished composition.

16. The composition of claim 15 wherein said $Al_2O_3$ and $Cr_2O_3$ independently have a particle size of about 325 mesh.

17. The composition of claim 15 wherein said mineral spirits comprise a hydrotreated middle petroleum distillate of $C_{14}$-$C_{18}$ isoparaffinic hydrocarbons.

18. A process for preparing a cleaning and polishing composition for metals, comprising the steps of
   mixing a flour component comprising unrefined wheat flour passing through a 100 mesh screen sieve, present in from about 0.25 wt. % to about 0.35 wt. %, the wt. % being based on the finished cleaner and polish composition, from about 9 wt. % to about 14 wt. % $Al_2O_3$ having a particle size of about 325 mesh, from about 2.5 wt. to about 4.8 wt. % $Fe_2O_3$ having a particle size of about 325 mesh, from about 3.6 wt. % to about 8 wt. % of a composition comprising hydrogenated animal fat, tallow glycerides, process oils, and wetting agents, the wt. % being based on the finished cleaning and polishing composition, and a mineral spirits component comprising a hydrogenated middle petroleum distillate of $C_{14}$-$C_{18}$ isoparaffinic hydrocarbons, present from about 77 wt. % to about 82 wt. %, the wt. % being based on the finished cleaner and polish composition, warming and agitating the above mixture, with the final temperature being between about 190° F. and 210° F., and cooling the mixture.

19. A process for preparing a cleaning and polishing composition for metals, comprising the steps of mixing a flour component comprising unrefined wheat flour passing through a 100 mesh screen sieve, present in from about 0.25 wt. % to about 0.35 wt. %, the wt. % being based on the finished cleaner and polish composition, and from about 11 wt% to about 17.7 wt. % $Al_2O_3$ having a particle size of about 325 mesh, from about 0.5 wt. % to about 3.5 wt. % $Cr_2O_3$ having a particle size of about 325 mesh, and from about 3.5 wt. % to about 8 wt. % of a composition comprising hydrogenated animal fat, tallow fats and triglycerides, petroleum oils and surfactants, the wt. %s being based on the finished cleaning and polishing product, and a mineral spirits component comprising a hydrogenated middle petroleum distillate of $C_{14}$-$C_{18}$ isoparaffinic hydrocarbons, present from about 77 wt. % to about 82 wt. %, the wt. % being based on the finished cleaner and polish composition, warming and agitating the above mixture, with the final temperature being between about 190° F. and 210° F., and cooling the mixture.

20. The process of claim 5 wherein the metal oxides have a particle size of about 325 mesh.

* * * * *